United States Patent [19]

McDonald

[11] Patent Number: 4,841,730
[45] Date of Patent: Jun. 27, 1989

[54] THERMAL ACTUATOR

[75] Inventor: John E. McDonald, San Juan Capistrano, Calif.

[73] Assignee: PDA Engineering, Costa Mesa, Calif.

[21] Appl. No.: 191,287

[22] Filed: May 5, 1988

Related U.S. Application Data

[63] Continuation-in-part of Ser. No. 69,110, Jul. 2, 1987.

[51] Int. Cl.$^4$ .................................................. F03G 7/06
[52] U.S. Cl. ............................................ 60/527; 60/529
[58] Field of Search .......................... 60/527, 528, 529; 337/123, 139, 140

[56] References Cited

U.S. PATENT DOCUMENTS

| | | |
|---|---|---|
| 3,152,554 | 10/1964 | Kofink . |
| 3,403,238 | 4/1966 | Buehler et al. . |
| 3,582,856 | 6/1969 | Watrous et al. . |
| 3,613,732 | 7/1969 | Willson et al. . |
| 3,634,803 | 7/1969 | Willson et al. . |
| 3,652,969 | 3/1972 | Willson et al. . |
| 3,725,835 | 7/1970 | Hopkins . |
| 3,783,429 | 6/1972 | Otte . |
| 3,823,560 | 7/1974 | Hansen .................................. 60/527 |
| 3,906,422 | 9/1974 | Healy . |
| 4,030,298 | 6/1977 | Sandoval . |
| 4,068,820 | 1/1976 | Pimentel . |
| 4,087,971 | 5/1978 | Hart . |
| 4,523,605 | 4/1984 | Ohkata . |
| 4,593,528 | 6/1986 | Bailey ................................... 60/673 |

OTHER PUBLICATIONS

A Source Manual for Information on Nitinol and NiTi by David Goldstein Research & Technolgy Dept., Naval Surface Weapons Center, 2/13/78.
A Survey of Thermal Battery Designs and Their Performance Characteristics by F. Tepper, Catalyst Research Corp., Baltimore, Md.

Primary Examiner—Allen M. Ostrager
Attorney, Agent, or Firm—Gordon L. Peterson

[57] ABSTRACT

An actuator comprising an actuator body, a shape memory member mounted on the body and a heating element in heat exchange relationship to the shape memory member. By activating the heating element, sufficient heat is generated to heat the shape memory member to its transition temperature so that it deforms from a distorted shape toward its original shape.

29 Claims, 4 Drawing Sheets

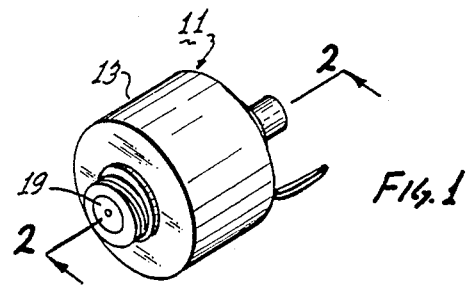
Fig. 1
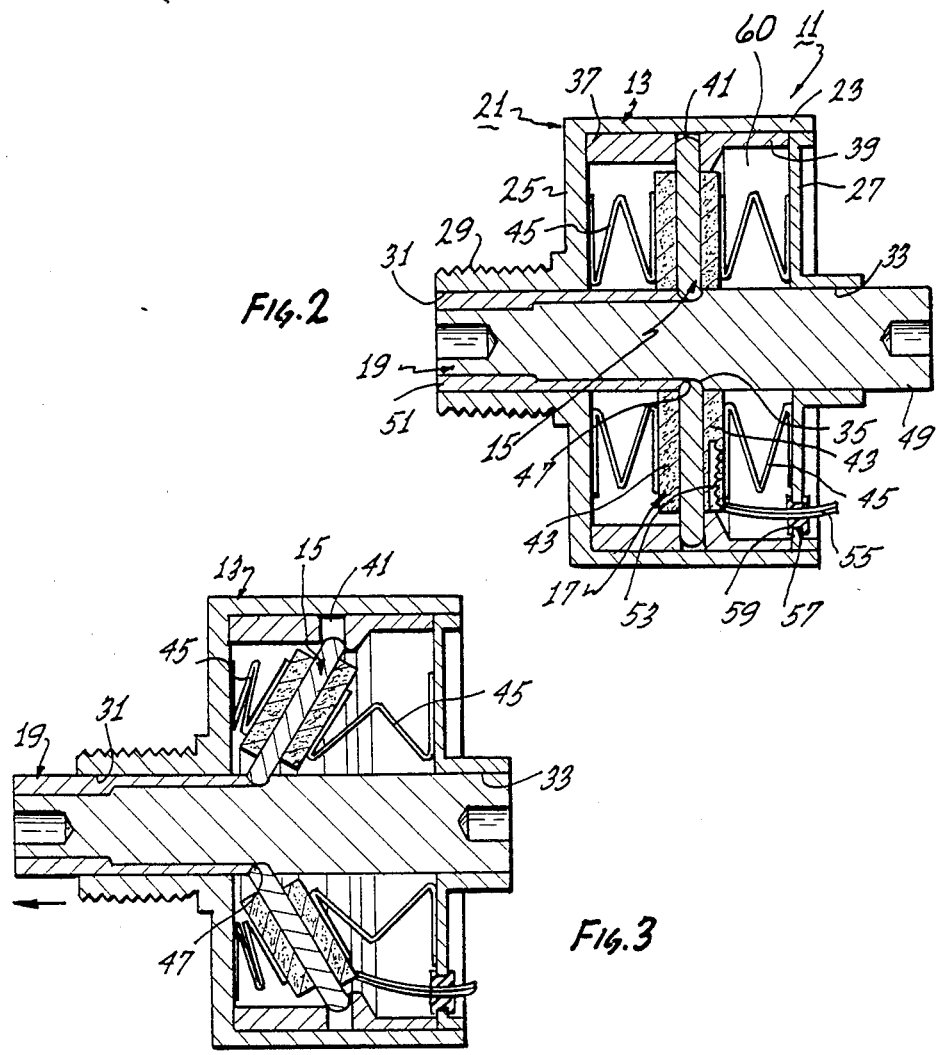
Fig. 2
Fig. 3

4,841,730

THERMAL ACTUATOR

BACKGROUND OF THE INVENTION

This application is a continuation-in-part of application Ser. No. 069,110 filed July 2, 1987, and entitled "Actuator", now pending.

This invention relates to an actuator which employs a shape memory member. As is well known, a shape memory member when heated to a transition temperature deforms from a distorted shape to an original shape. More specifically, shape memory members can be used to provide power for various tasks, such as valve and switch operation.

Nitinol is one class of materials having the shape memory characteristic. More specifically, Nitinol is the generic name which has been given to a family of alloys which contain both nickel and titanium, for example, alloys which are near NiTi in composition.

It is known to employ direct electrical heating of a shape memory member to raise the shape memory member to its transition temperature. For example, direct electrical heating of a shape memory member is disclosed in Willson et al U.S. Pat. No. 3,634,803, Pimentel U.S. Pat. No. 4,068,820 and Hopkins et al U.S. Pat. No. 3,725,835. It is also known to electrically heat an intermediate member which in turn heats the shape memory member, and this is disclosed, for example, in Willson et al U.S. Pat. No. 3,613,732. It is also known to heat a shape memory member utilizing a radiant heat source, and this is disclosed, for example, in Willson et al U.S. Pat. No. 3,652,969.

One problem in elevating a shape memory member to its transition temperature is that relatively high electrical energy is required. This may require, for example, a relatively high energy power source and associated wiring to actuate the shape memory member. In addition, the direct or indirect electrical heating of the shape memory member interposes a time delay between energization of the heat source and actuation of the shape memory member because of the time required for the electrical heating of the shape memory member to its transition temperature.

It is also known to employ solar heating or gas flame heating to heat foils or strips exhibiting a shape memory effect, and this is disclosed, for example, in Hart U.S. Pat. No. 4,087,971. Gas flame heating is undesirable for many applications because it requires atmospheric air to sustain combustion. Accordingly, flame heating of a shape memory member cannot be used where there is essentially no atmospheric air, such as underwater, in space or in a vacuum. In addition, gas flame heating cannot be used where the atmospheric air is present in quantities too small to sustain combustion of the gas for a sufficient length of time to heat the shape memory member to its transition temperature. An example of this latter condition is a small hermetically sealed actuator. A gas is also undesirable as a heat source because it is less compact than a liquid or solid, generally provides less heat per unit volume than a liquid or solid, needs to be stored under pressure, and undergoes significant volume and/or pressure changes in response to temperature changes.

SUMMARY OF THE INVENTION

This invention solves these problems and provides various other advantages. This invention uses a particular kind of heating element to raise the shape memory member to its transition temperature. The heating element includes at least first and second components capable when activated of interacting exothermically even in the absence of atmospheric air to heat the shape memory member to its transition temperature. Because the heating element does not require atmospheric air, it can be used with a shape memory member in environments having little or no atmospheric air, such as underwater, in space, in highly confined hermetically sealed housings, etc. Even if atmospheric air is present, the exothermic interaction of the components proceeds substantially independently of any ambient atmosphere.

According to another feature of this invention, preferably at least one of the heating element components, and more preferably the entire heating element, is non-gaseous before activation, i.e., is in a liquid and/or solid state under normal conditions of use. As such, it can generally provide more heat per unit volume than a gaseous heating element and undergoes less volumetric and pressure changes as ambient temperature changes occur. Both liquid and solid heating elements are easier to contain than a gaseous heating element, but a solid heating element is preferred because that is even easier to contain and handle than a liquid heating element.

The heating element, which may comprise two or more components, may be of various different compositions so long as the components are capable, when activated, of interacting exothermically even in the absence of atmospheric air to produce the temperature needed. In a preferred embodiment, the first and second components, when activated, react chemically and exothermically, and in a more preferred embodiment, the first and second components include an oxidizing agent and a reducing agent, respectively. However, the heating element may include, or consist of, components which interact exothermically in other ways. For example, the components when activated may combine to yield heat of solution. One preferred heating element is heat paper or heat pellets.

The components of the heating element may be activated in various different ways, such as by heat or in response to contact with each other. A bridge wire which requires only a low level of electrical energy, may be used to provide the heat necessary for the heat-activated components. If desired, a small quantity of combustible material can be applied to the bridge wire so that the combination will serve as an electric match to heat the heating element sufficiently to activate it.

When using components which interact exothermically when in contact with each other, the components are isolated from each other by an isolation means prior to activation. It is preferred that at least one of the components be a liquid. When such components are used, the activating means includes means for disrupting the isolating means sufficiently to allow the components to come into contact with each other. More specifically, the isolating means may include a container for the first component, and the activating means may include a bridge wire for disrupting the container sufficiently to allow the components to come into contact with each other. If one of the components is a liquid, contact of the components in response to a disruption of the container is facilitated.

In a preferred heating element, the exothermic interaction gives off essentially no gas. This is advantageous in that no means of escape for the gas needs to be provided. Also, this is advantageous for those applications where the release of the gas would be undesirable.

The heating element may include a heat sink component for controlling the temperature of the exothermic interaction. This can be used to advantage where the exothermic interaction would otherwise produce unacceptably high temperatures.

The heating element can be easily activated as by relatively low level electrical energy, and accordingly, the need for a relatively large power source and associated wiring is eliminated. Moreover, the heating element yields high temperatures and can raise the shape memory member to its transition temperature very rapidly. Accordingly, the time delay between energization of the electrical circuit and actuation of the shape memory member is reduced. This is particularly important when the shape memory member is used to actuate a valve or switch for emergency purposes.

The features of this invention can be advantageously embodied in an actuator which can be used to actuate various devices, such as a valve, a switch, control components, etc. The actuator can be hermetically sealed and stored for long periods of time without concern about its actuation abilities.

The actuator may comprise an actuator body and a shape memory member that deforms from a distorted shape toward an original shape when heated to a transition temperature. The heating element is provided in heat exchange relationship to the memory member. The heating element is capable when activated of heating the shape memory member to its transition temperature so that the shape memory member deforms toward its original shape. The actuator may comprise various different physical constructions and may provide rotary or linear motion.

An important advantage of this invention is that the actuator may comprise means including the actuator body for defining an essentially sealed chamber, and the heating element is in the chamber. If desired, the chamber can be hermetically sealed, and this is particularly useful when the actuator is in place for a very long period of time prior to actuation. This is also useful, and in some cases essential, if the actuator is to be used in certain environments, such as an underwater environment. If the actuator is sealed, or essentially sealed, and the heating element produces gas, it is preferred to provide pressure relief means responsive to the pressure in the chamber of the actuator reaching a predetermined level for relieving the pressure.

The features of this invention are particularly advantageous when used with a one-shot actuator. In this regard, the heating element would ordinarily be fully consumed in the single usage.

The heating element is preferably closely adjacent, or in contact with, the shape memory member so that it can rapidly raise the shape memory member to its transition temperature. One way to accomplish this is by placing portions of the heating element on opposite sides of the shape memory member. Alternatively, the heating element may include a sleeve portion for receiving the shape memory member.

The invention, together with additional features and advantages thereof, may best be understood by reference to the following description taken in connection with the accompanying illustrative drawing.

BRIEF DESCRIPTION OF THE DRAWING

FIG. 1 is an isometric view of one form of linear actuator constructed in accordance with the teachings of this invention.

FIG. 2 is an enlarged sectional view taken generally along line 2—2 of FIG. 1, with the shape memory member in its distorted shape.

FIG. 3 is an axial sectional view similar to FIG. 2 with the shape memory member in its original shape.

DESCRIPTION OF THE PREFERRED EMBODIMENTS

Figure 4:
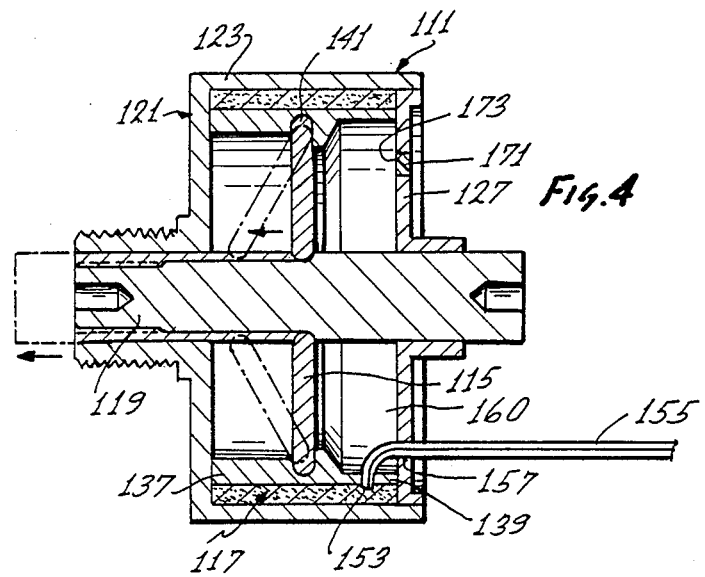
FIG. 4 is an axial sectional view similar to FIG. 2 illustrating a second embodiment of linear actuator, with the actuated position shown in phantom lines.

FIGS. 1-3 show a linear actuator 11 which generally comprises an actuator body 13, a shape memory member 15, a heating element 17 and an actuator member 19. The actuator body 13, which can be of various different constructions, comprises a body member 21 having an annular peripheral wall 23, an end wall 25 and an end wall 27 suitably affixed to the peripheral wall 23 to form the actuator body into a housing. The body member 21 also has an externally threaded boss 29, and the end walls 27 and 29 have axially aligned circular openings 31 and 33, respectively.

Although the shape memory member 15 can be of various different constructions, in this embodiment, it is in the form of a disc or circular washer having a central circular aperture 35. The shape memory member 15 is mounted within the actuator body 13 by axially spaced annular retainers 37 and 39 which are spaced axially to form an annular groove 41 for receiving an annular outer peripheral portion of the shape memory member 15. This, in effect, loosely couples the outer periphery of the shape memory member 15 to the peripheral wall 23 of the actuator body 13. The retainers 37 and 39 may be suitably affixed to the peripheral wall 23.

The shape memory member 15 is constructed of Nitinol and has a distorted shape shown in FIG. 2 in which it lies in a single plane. By heating the shape memory member 15 to a transition temperature, it will assume its distorted shape shown in FIG. 3. In its distorted shape, the shape memory member 15 is frusto-conical.

The heating element 17 can be of different constructions, but in this embodiment, it includes annular, circular discs 43 of heat paper on opposite sides of the shape memory member 15. As is well known in the thermal battery field, heat paper comprises a paper-like mat impregnated with a pyrotechnic composition. A similar product known as heat pellets, as well as various other pyrotechnic compositions, may be used in lieu of heat paper. As described more fully below, both heat paper and heat pellets include components which, when activated by heat, react exothermically in a chemical reaction without the evolution of a gas. However, any of the compositions disclosed herein for the heating element may be used as the heating element of the actuator 11, as well as for the heating element of any and all of the embodiments described herein. The discs 43 engage the shape memory member 15 in a sandwich-like construction, and the discs are held in this position by springs 45 which bear against the associated disc 43 and the confronting end wall 25 or 27.

In this embodiment, the actuator member 19 is in the form of a rod or shaft which extends through the aperture 35 of the shape memory member 15 and into or through the openings 31 or 33 of the end walls 25 and 27. The actuator member 19 is slidably mounted in the actuator body 13 by the openings 31 and 33 for axial movement. The shape memory member 15 drivingly engages the actuator member 19 at the inner periphery of the shape memory member. Although various techniques can be utilized to drivingly couple the shape memory member 15 to the actuator member 19, in this embodiment, the inner periphery of the shape memory member 15 is received in an annular groove 47 of the actuator member 19. In this embodiment, the groove 47 is formed as a result of making the actuator member 19 of a main body member 49 and a sleeve 51 mounted on the main body. The main body member 49 has a reduced diameter region over which the sleeve 51 fits and with which the sleeve 51 cooperates to define the groove 47.

In this embodiment, the heating element 17 is activated by a bridge wire 53 suitably coupled to an appropriate source of electrical energy (not shown) by conductors 55 which extend through a hole 57 in the end wall 27. In FIGS. 2 and 3, only the righthand disc 43 is shown as having a bridge wire 53 embedded therein; however, it should be understood that a separate bridge wire (not shown) may also be embedded in the lefthand disc 43 of the heating element to ignite the latter.

The actuator body 13 may be hermetically sealed, if desired. For this purpose, annular seals (not shown) may be provided between the actuator member 19 and the openings 31 and 33, and a sealing member 59, such as a grommet or a suitable potting composition, may be used to seal the hole 57 around the conductors 55. This provides an hermetically sealed chamber 60 within the actuator body 13 which contains the heating element 17. Consequently, the actuator 11 can be stored for long periods at remote locations and used in various environments, such as underwater where its use would otherwise not be reasonably possible. However, the chamber 60 is of relatively small volume so that any atmospheric air contained in the chamber 60 would be unlikely to be sufficient to support combustion for a sufficient period to raise the shape memory member 15 to its transition temperature.

As shown in FIG. 2, the shape memory member is in its distorted shape, and the righthand end portion of the actuator member 19 projects out of the opening 33 of the end wall 27. When electrical energy is applied to the bridge wire 53, the heating element 17 is heated sufficiently to cause the components of the heating element to interact exothermically to instantly generate a substantial quantity of heat to rapidly raise the shape memory member 15 to its transition temperature. At this point, the shape memory member 15 deforms or moves to its original frusto-conical shape as shown in FIG. 3. Because the outer periphery of the shape memory member 15 is restrained axially by the groove 41, the inner periphery of the shape memory member moves axially to drive the actuator member 19 to the left by virtue of the driving engagement between the inner periphery of the shape memory member and the groove 47 in the actuator member 19. This drives the left end of the actuator member 19 out of the opening 31 and retracts the right end of the actuator member into the opening 33 so that the actuator member is flush with the end of the opening 33. The spring 45 on the left side of the shape memory member 15 is compressed, and the spring 45 on the other side of the shape memory member extends during movement of the shape memory member toward its original shape. This tends to maintain contact between the heating element 17 and the shape memory member 15 at least during initial movement of the shape memory member, and the collapsing of the lefthand spring 45 allows the leftward movement of the shape memory member.

FIG. 4 shows an actuator 111 which is identical to the actuator 11 in all respects not shown or described herein. Portions of the actuator 111 corresponding to portions of the actuator 11 are designated by corresponding reference numerals preceded by the numeral "1."

The primary differences between the actuators 11 and 111 are that the heating element 117 of the latter is tubular, and the end wall 127 has a pressure relief member 171 releasably closing an aperture 173 in the end wall 127. In addition, the springs 45 are not used in the actuator 111.

More specifically, the heating element 117 is in the form of a sleeve sandwiched between the peripheral wall 123 and the retainers 137 and 139. Also, in this embodiment, the retainers 137 and 139 are integral and have the groove 141 formed therein, and the conductors 155 extend through an opening in the retainer 139 to the bridge wire 153, which is embedded in the heating element 117.

The actuator 111 is particularly adapted for use with a heating element 117 of the type which gives off a gas when the components thereof interact exothermically. Examples of gas-producing heating elements are given below. The aperture 173 should be large enough to adequately vent the gas from the heating element, and the pressure relief member 171 should be retained in the aperture 173 so that it blows out of the aperture in response to the pressure in the chamber 160 reaching a predetermined level to thereby relieve the pressure in the chamber. For example, the pressure relief member 171 may be in the form of a rubber or plastic plug frictionally retained within the aperture 173. The actuator 111 operates in the same manner as described above for the actuator 11.

Figure 5:
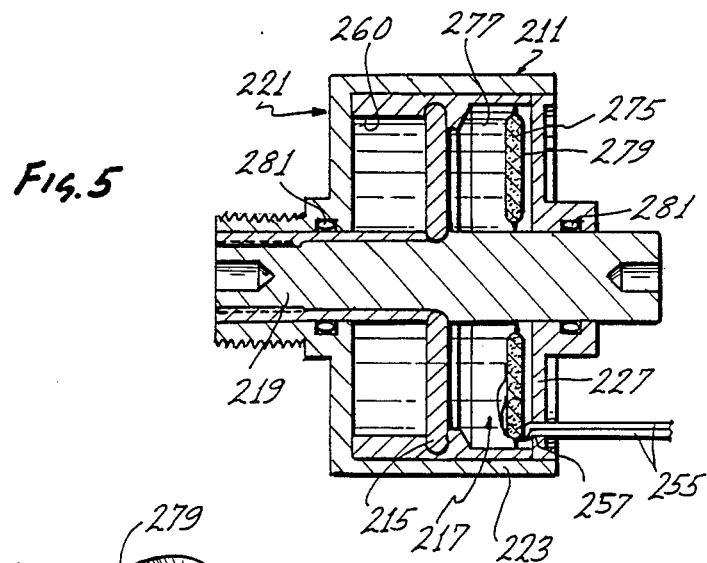
FIG. 5 is an axial, sectional view similar to FIG. 2 showing a third embodiment of linear actuator.
Figure 6:
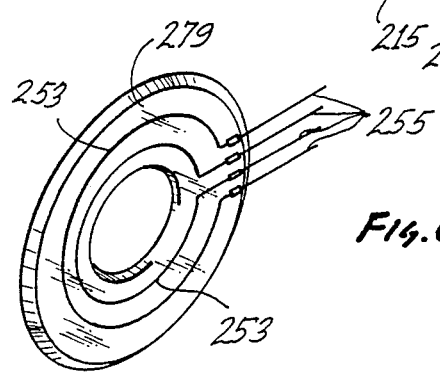
FIG. 6 is an isometric view of the container for one of the components of the heating element of FIG. 5.

FIGS. 5–6 show an actuator 211 which is identical to the actuator 111 in all respects not shown or described herein. Portions of the actuator 211 corresponding to portions of the actuator 111 are designated by corresponding reference numerals increased by "100."

The primary difference between the actuators 211 and 111 is that the former is particularly adapted for use with a heating element 217 of the type in which the components thereof are activated to interact exothermically when they are placed in contact with each other. Typically, in such a situation, at least one of the components of the heating element 217 is a liquid. This can be distinguished from the actuators 11 and 111 which are primarily adapted for employing solid state heating elements.

To accomplish this, the heating element 217 includes heating element components 275 and 277, with the component 275 being contained within a sealed, generally toroidal-shaped container 279, and with the component 277 being contained within the chamber 260 outside of the container 279. For example, the component 275 may be anhydrous $H_2SO_4$, or a gaseous heating element component, and the component 277 may be water or other heating element component. In this event, a disruption or rupturing of the container 279 brings the anhydrous $H_2SO_4$ and water into contact so that the heat of solution provided by the intermixing of these components can elevate the temperature of the shape memory member 215 to its transition temperature. To seal the component 277 within the chamber 260, the end wall 227 is appropriately sealed to the peripheral wall 223, and the hole 257 in the end wall 227 is appropriately sealed around the conductors 255. Also, O-ring seals 281 are carried by the body member 221 to seal between the body member 221 and the actuator member 219.

The container 279 may be constructed of any impermeable material which is not corrosive with either of the components 275 or 277 and which can be ruptured by the application of electrical energy to the bridge wires 253 or by the heat resulting from the current passing through the bridge wires. As shown in FIG. 6, two concentric bridge wires 253 arranged in a nearly circular pattern are attached to a toroidal face of the container 279; however, this is purely illustrative.

If the heating element components 275 and 277 are of the type that produce gas upon mixing, then an aperture and pressure relief member of the type discussed above in connection with the actuator 111 should be provided. No such pressure relief member and aperture are shown in FIGS. 5 and 6 because, for the example given, essentially no gas is produced.

The operation of the actuator 211 is the same as the operation of the actuators 11 and 111, except that the passing of current through the bridge wires 253 serves to rupture the container 279 to allow the heating element components 275 and 277 to contact and mix. This results in an exothermic interaction of the components 275 and 277 and produces heat of solution which heats the shape memory member 215 to its transition temperature.

Figure 7:
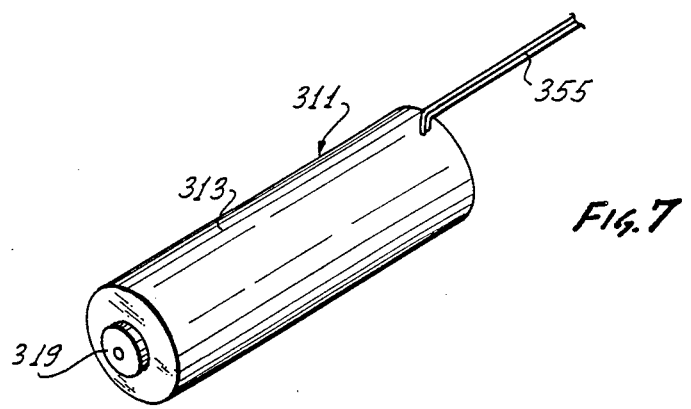
FIGS. 7-9 are views similar to FIGS. 1-3, respectively, illustrating a fourth embodiment of linear actuator.
Figure 8:
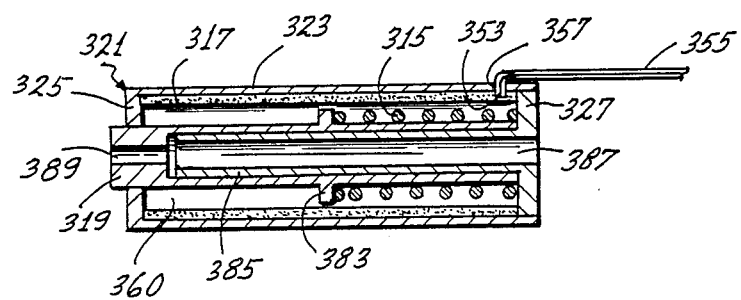
Figure 9:
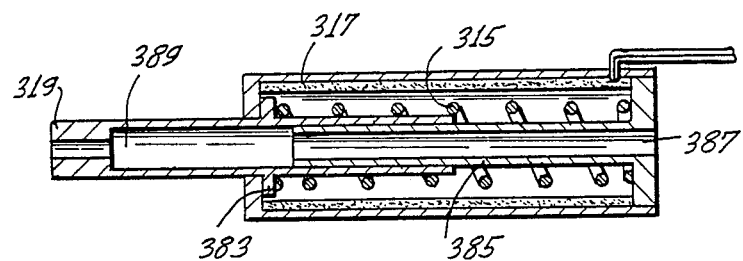

FIGS. 7–9 show an actuator 311 which is identical to the actuator 11 in all respects not shown or described herein. Portions of the actuator 311 corresponding to portions of the actuator 11 are designated by corresponding reference numerals increased by "300."

The primary difference, in addition to structural differences, between the actuators 11 and 311 is that in the latter, the shape memory member 315 is in the form of a coil spring. In its original shape, the spring 315 is extended as shown in FIG. 9, and in the distorted shape, the spring 315 is compressed as shown in FIG. 8. The spring 315 bears at one end against the end wall 327 and at its other end against a flange 383 of the actuator member 319. In this embodiment, the actuator member 319 is in the form of a sleeve which is slidable on a mounting tube 385 carried by the end wall 327. There is a continuous axial passage through the actuator 311 formed by a passage 387 in the tube 385 and a passage 389 through the actuator member 319.

With this construction, the chamber 360 is of an annular configuration and lies between the actuator member 319 and the actuator body 321. The heating element 317 is in the form of a sleeve or tube and forms a liner for the peripheral wall 323. A bridge wire 353 is embedded in the heating element 317, and the conductors 355 extend through the hole 357, which is formed in the peripheral wall 323. If desired, the chamber 360 may be hermetically sealed as described above, and an aperture or pressure relief member may be provided as shown by way of example for the actuator 111 of FIG. 4.

The actuator member 319 may be held in the retracted position of FIG. 1 in a variety of ways, such as by gravity, a friction fit with the mounting tube 385, by an attachment to the spring 315, etc. When the heating element 317 is activated by the bridge wire 353, the spring 315 is heated to its transition temperature whereupon it expands axially to the shape shown in FIG. 9 to thereby drive the actuator member 319 to the left as shown in FIG. 9.

Figure 10:
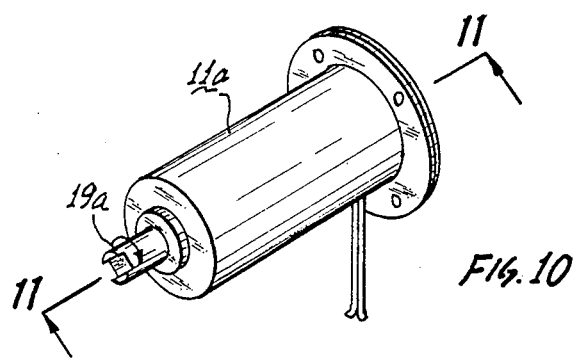
FIG. 10 is an isometric view of one form of rotary actuator constructed in accordance with the teachings of this invention.
Figure 11:
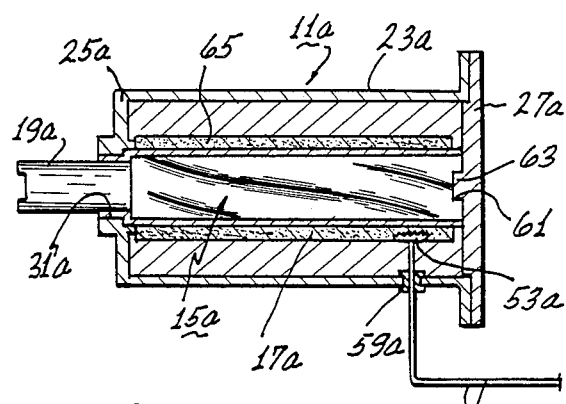
FIG. 11 is an enlarged sectional view taken generally along line 11—11 of FIG. 10, with the shape memory member in its distorted shape.
Figure 12:
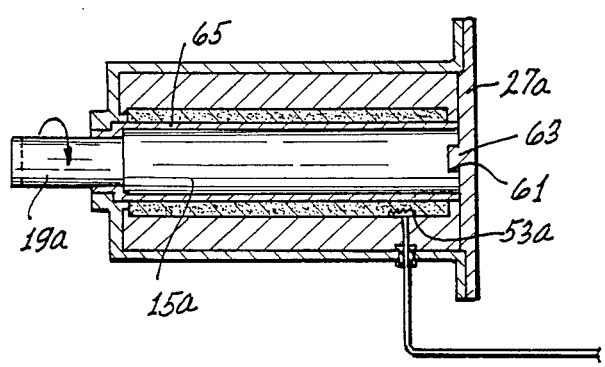
FIG. 12 is a sectional view similar to FIG. 11, with the shape memory member in its original shape.

FIGS. 10–12 show an actuator 11a which is identical to the actuator 11 in all respects not shown or described herein. Portions of the actuator 11a corresponding to portions of the actuator 11 are designated by corresponding reference numerals followed by the letter "a."

The primary difference between the actuators 11 and 11a is that the former is a linear actuator, and the latter is a rotary actuator. Thus, the shape memory member 15a has a distorted shape in which it is torsionally deformed about its longitudinal axis as shown in FIG. 11 and an original shape in which it is not torsionally deformed as shown in FIG. 12.

In order that the shape memory member 15a can impart rotary motion, its right-hand end is affixed against rotation relative to the end wall 27a by virtue of a groove 61 in the end of the shape memory member 15a and a tab 63 on the end wall 27a which projects into the groove 61.

In the embodiment of FIGS. 10–12, the actuator member 19a, which need not be of shape memory material, is suitably affixed to the opposite end of the shape memory member 15a and forms an extension thereof. The shape memory member 15a and a short length of the actuator member 19a are mounted for rotational movement in an elongated cylindrical bearing 65 which has its opposite ends affixed to the end walls 25a and 27a. The bearing 65 is preferably constructed of a material which has high thermal conductivity. The actuator member 19a projects through an opening in the bearing 65 and through the opening 31a in the end wall 25a.

In this embodiment, the heating element 17a is in the form of a sleeve which receives and surrounds substantially the full length of the bearing 65 and the shape memory member 15a. The heating element 17a is activated by a bridge wire 53a.

When it is desired to actuate the actuator 11a, electrical energy is supplied to the bridge wire 53a via the conductors 55a to heat the heating element 17a. The heating element 17a rapidly raises the shape memory member 15a to its transition temperature whereupon the shape memory member 15a rotates to its original position of FIG. 12. Because the righthand end of the shape memory member 15a is held against rotation by virtue of the engagement of the tab 63 and the groove 61, all of the rotary motion of the shape memory member results in rotation of the actuator member 19a.

There are a variety of heating element compositions that can be used which will meet the general requirements of this invention. Generally, any of these compositions can be used with any of the actuators illustrated in FIGS. 1-12; however, the actuator 211 of FIGS. 5 and 6 is particularly adapted for use with a heating element having at least one liquid component, and the actuators of the other embodiments are particularly adapted for use with solid heating elements. Also, the gas-producing heating elements preferably have a vent or pressure relief member as shown, for example, in FIG. 4.

Illustrative of non-gas producing interactions useful in the heating elements include the combination of elemental sodium (considered a reducing agent since elemental sulfur is reduced in oxidation state) and elemental sulfur (considered an oxidizing agent since elemental sodium is increased in oxidation state) to produce sodium sulfide; potassium chromate and antimony sulfide to produce potassium chloride plus antimony oxide plus chromic oxide ($Cr_2O_3$); Goldschmidt's thermite reactions, i.e., chromium trioxide ($CrO_3$) plus aluminum to produce chromium plus alumina, and ferric oxide plus aluminum to produce iron plus alumina; and the heat paper or heat pellet reaction, i.e., zirconium plus barium chromate to produce zirconia plus baria plus chromic oxide. Examples of gas-producing interactions useful in the present heating elements include chemical reactions of phosphorous trisulfide ($P_4S_3$) with lead dioxide to produce phosphorous trioxide ($P_2O_3$) plus sulfur dioxide plus lead oxide (PbO); potassium perchlorate with antimony sulfide to produce potassium chloride plus antimony oxide plus sulfur dioxide; unsymmetrical dimethyl hydrazine with red fuming nitric acid to produce nitric oxide plus water plus carbon dioxide; and ammonium perchlorate with a hydrocarbon, such as polyethylene, to produce nitric oxide plus hydrogen chloride plus water plus carbon dioxide.

Although exemplary embodiments of the invention have been shown and described, many changes, modifications and substitutions may be made by one having ordinary skill in the art without necessarily departing from the spirit and scope of this invention.

I claim:

1. An actuator comprising:
    an actuator body;
    a shape memory member that deforms from a distorted shape toward an original shape when subjected to a transition temperature, said shape memory member being in said distorted shape;
    means for mounting the shape memory member on the actuator body so that the shape memory member can deform from said distorted shape toward said original shape;
    a heating element in heat exchange relationship to the shape memory member, said heating element including at least first and second components capable when activated of interacting exothermically even in the absence of atmospheric air to heat the shape memory member to said transition temperature whereby the shape memory member deforms toward the original shape; and
    means for activating the first and second components.

2. An actuator as defined in claim 1 wherein the first and second components when activated react chemically and exothermically.

3. An actuator as defined in claim 1 wherein the first and second components include an oxidizing agent and a reducing agent, respectively.

4. An actuator as defined in claim 3 wherein the first and second components are solid and the exothermic interaction gives off essentially no gas.

5. An actuator as defined in claim 1 wherein the first and second components when activated interact to yield heat of solution.

6. An actuator as defined in claim 1 wherein the heating element includes heat paper or a heat pellet.

7. An actuator as defined in claim 1 wherein the heating element is nongaseous.

8. An actuator as defined in claim 1 wherein the heating element is a solid.

9. An actuator as defined in claim 1 wherein the exothermic interaction gives off essentially no gas.

10. An actuator as defined in claim 1 wherein the first and second components interact exothermically when in contact with each other, said actuator includes means for isolating said first and second components from each other and said activating means includes means for disrupting the isolating means sufficiently to allow the first and second components to come into contact with each other.

11. An actuator as defined in claim 10 wherein at least one of said first and second components is a liquid, said isolating means includes a container for the first component and the activating means includes a bridge wire for disrupting the container sufficiently to allow the first and second components to come into contact with each other.

12. An actuator as defined in claim 1 wherein the activating means includes a bridge wire adjacent at least one of the first and second components.

13. An actuator as defined in claim 12 wherein the first and second components are activated by heat and the bridge wire provides such heat.

14. An actuator as defined in claim 1 wherein the heating element includes a heat sink component for controlling the temperature of the exothermic interaction.

15. An actuator as defined in claim 1 including means including the actuator body for defining an essentially sealed chamber, said heating element being in said chamber.

16. An actuator as defined in claim 15 including pressure relief means responsive to the pressure in said chamber reaching a predetermined level for relieving the pressure in said chamber.

17. An actuator as defined in claim 1 wherein portions of the heating element are on opposite sides of the shape memory member.

18. An actuator as defined in claim 1 wherein said shape memory member is elongated and is torsionally deformed in said distorted shape and said heating element includes a sleeve portion which receives the shape memory member.

19. An actuator as defined in claim 1 including an actuator member mounted for movement on said actuator body and drivingly coupled to said shape memory member.

20. An actuator as defined in claim 19 wherein said shape memory member includes a disc drivingly engaging the actuator member, said disc moving the actuator member generally axially when the disc deforms toward said original shape.

21. An actuator as defined in claim 1 wherein said actuator body includes a housing having a peripheral wall and opposite end walls, said shape memory member is elongated and is torsionally deformed in said distorted shape, said mounting means includes a bearing within said housing, said shape memory member being received in said bearing, said shape memory member having opposite ends with one of said ends being affixed against rotation to one of said end walls and the other of said ends being outside of said housing, said heating element including a sleeve portion which receives the shape memory member.

22. An actuator as defined in claim 21 wherein the activating means includes a bridge wire in the heating element for use in activating the heating element.

23. An actuator as defined in claim 1 wherein said actuator body includes a housing having a peripheral wall and opposite end walls with an opening in at least one of said end walls, said shape memory member includes a washer having an aperture therethrough, said actuator includes an actuator member, said shape memory member and said actuator member are mounted in said housing with the shape memory member drivingly engaging the actuator member and with the actuator member being extendible through said opening in said one end wall, said shape memory member having an outer periphery and said actuator includes means for coupling the outer periphery of the shape memory member to the peripheral wall of the actuator housing.

24. An actuator as defined in claim 1 wherein said actuator body includes a housing having a peripheral wall and opposite end walls with an opening in at least one of said end walls, said shape memory member includes a spring, said actuator includes an actuator member, said shape memory member and said actuator member are mounted in said housing with the shape memory member drivingly engaging the actuator member and with the actuator member being extendible through said opening in said one end wall.

25. An actuator comprising:
an actuator body;
a shape memory member that deforms from a distorted shape toward an original shape when subjected to a transition temperature, said shape memory member being in said distorted shape;
means for mounting the shape memory member on the actuator body so that the shape memory member can deform from said distorted shape toward said original shape;
a heating element in heat exchange relationship to the shape memory member, said heating element including at least first and second components at least one of which is nongaseous, said first and second components being capable when activated of interacting exothermically; and
means for activating the first and second components.

26. An actuator as defined in claim 25 wherein the heating element is solid and said activating means includes a bridge wire.

27. An actuator as defined in claim 25 wherein said heating element is nongaseous.

28. A method of raising a shape memory member which has been deformed from an original shape to a distorted shape to its transition temperature, said method comprising:
providing a heating element which includes at least first and second components capable when activated of interacting exothermically even in the absence of atmospheric air; and
activating the first and second components and allowing them to interact exothermically substantially independently of any ambient atmosphere sufficiently close to the shape memory member and for a sufficient length of time to raise the shape memory member to its transition temperature whereby the shape memory member deforms from a distorted shape toward an original shape.

29. A method as defined in claim 28 wherein said step of allowing is carried out substantially in the absence of atmospheric air.

* * * * *